United States Patent Office 3,300,491
Patented Jan. 24, 1967

3,300,491
VAT DYESTUFFS
Walter Jenny, Istvan Hari, Max Staeuble, and Kurt Weber, Basel, Switzerland, assignors to Ciba Limited, Basel, Switzerland, a Swiss company
No Drawing. Filed May 21, 1962, Ser. No. 196,433
Claims priority, application Switzerland, June 2, 1961, 6,485/61; Apr. 2, 1962, 3,967/62
6 Claims. (Cl. 260—249)

The present invention provides new vat dyestuffs that in their molecule contain at least one grouping of the formula (1) —SO$_2$—R or —S—R in which R represents a halogen-alkyl group, especially a halogen-alkyl group containing at least 2 carbon atoms in the alkyl grouping, in which grouping the halogen atom is attached to a terminal carbon atom. R advantageously represents the radical of the formula —CH$_2$CH$_2$—Halogen in which halogen may represent a bromine atom, but more especially a chlorine atom. The term "vat dyestuffs" includes dyestuffs which are capable of conversion by reduction into a so-called leuco form or vat which has better affinity for natural and regenerated cellulose fibers than has the non-reduced form, and which can be reconverted by oxidation into the original chromophoric system. As suitable vat dyestuffs there may be mentioned more especially those of the anthraquinone series, for example, those which contain an unchanged 9:10-dioxoanthracene ring, and also those anthraquinones that also contain fused on carbocyclic or heterocyclic rings or which consist of several anthraquinone units, as well as vat dyestuffs of the perylene tetracarboxylic acid series, the naphthalene tetracarboxylic acid series, the pyrenequinone series, and indigoid vat dyestuffs. In addition to at least one grouping of the Formula 1 the dyestuffs may also contain the substituents usual in vat dyestuffs, for example, halogen atoms, alkoxy groups, acylamino groups or alkyl groups. In certain cases the presence of hydrophilic groups can also be of advantage.

The new dyestuffs are obtained when (a) a vat dyestuff that contains an exchangeable halogen atom, for example, a vat dyestuff that contains a sulfonic acid halide group, is condensed with an amine that contains a substituent —SO$_2$—R or —S—R, in which R has the meaning given above, or (b) a vat dyestuff that contains at least one hydroxyalkyl sulfonyl group or hydroxyalkyl sulfido group is treated with chlorinating agents, or (c) an aminoanthraquinone is reacted with an acylating agent that contains a halogen alkylsulfido radical or a halogen alkylsulfone radical, especially one of the formula —SO$_2$—CH$_2$CH$_2$—Cl or —S—CH$_2$CH$_2$—Cl As starting materials for method (a) of the present process there are preferably used vat dyestuffs that contain at least one sulfonic acid chloride group. Of special interest are vat dyestuffs that contain two such groups. As examples of suitable starting materials there may be specially mentioned those of the anthraquinone series: 1:5-dibenzoylamino - anthraquinone-disulfochloride, dibenzanthrone-disulfochloride, isodibenzanthrone-disulfochloride, and the sulfochlorides of anthanthrone, dibenzpyrenequinone, pyranthrone, acedianthrone, flavanthrone, indanthrone, N:N'-diethyl-dipyrazole anthronyl, N:N'-diisopropyldipyrazole anthronyl, anthraquinone-2:1(N)1':2'-(N)-naphthacridone, 1:1'-dianthrimide carbazole, and 2':2" - diphenyl - anthraquinone-1:2(N)-5:7(N)-dithiazole.

In addition to the sulfochlorides of the anthraquinone series already mentioned, there may also be used sulfochlorides of indigoid vat dyestuffs or of perylene tetracarboxylic acid diimides or of perinone dyestuffs. The aforesaid sulfochlorides can be obtained by treating the appropriate vat dyestuffs with chlorosulfonic acid, if necessary with partial hydrolysis of the polysulfochlorides so obtained, or by reacting the appropriate sulfonic acid with acid-halogenating agents, such as phosphorus halides, thionyl chloride or chlorosulfonic acid by known methods. Another method of obtaining the sulfochlorides that are to serve as starting materials consists in acylating amino-anthraquinones with benzoic acid-sulfonic acid dichloride, in which process a chlorosulfonyl-benzoyl-amino-anthraquinone is formed. In method (a) of the present process there are also used as starting materials the reaction products of aminoanthraquinones with halogen-pyrimidines or halogentriazines, such as cyanuric chloride, that contain at least one exchangeable chlorine atom, for example, a compound of the formula

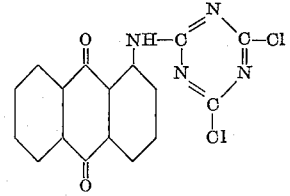

These are reacted with an amine that contains a β-halogen-alkylsulfone group or a β-halogenalkyl sulfide group, for example, with the amine of the formula

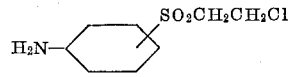

or with an amine of the formula

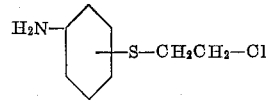

The reaction of the vat dyestuffs that contain exchangeable halogen atoms, for example, the reaction of the aforesaid sulfochlorides with the amine that contains a substituent —SO$_2$R or —S—R can be carried out in an inert organic solvent, for example, nitrobenzene, chlorobenzene or ortho-dichlorobenzene at a raised temperature. However, since the sulfochlorides are generally obtained in aqueous suspension when they are prepared, it is of advantage to carry out the reaction with the amine in aqueous medium, advantageously in the presence of an agent capable of binding acid, for example, sodium acetate, sodium hydroxide or sodium carbonate. The molar ratios of the components are advantageously chosen in such a manner that at least one mol of amine is used for each sulfochloride group of the vat dyestuff.

The starting materials for method (b) of the present process are advantageously anthraquinone vat dyestuffs that contain one or two hydroxyalkyl sulfone groups or hydroxy-alkyl sulfide groups, advantageously a group of this kind that contains at least two carbon atoms, such as the β-hydroxyethyl-sulfone groups or the β-hydroxyethyl-sulfide groups, for example, the mono-or di-β-hydroethyl-sulfones of 1:5-dibenzoylamino-anthraquinone, of dibenzanthrone or of isodibenzanthrone as well as the hydroxyethyl-sulfones or hydroxyethyl-sulfides of anthanthrone, dibenzpyrene quinone, pyranthrone, acedianthrone, flavanthrone, indanthrone, N:N'-diethyldipyrazole anthronyl, N,N'-diisopropyldipyrazole anthronyl, anthraquinone-2:1(N)1'2'(N) - naphthacridone, 1:1'-dianthrimide carbazole, and 2':2"-di-phenylanthraquinone-1:2-(N)-dithiazole. In addition to the aforesaid β-hydroxyethyl-sulfones or sulfides of the anthraquinone series, there may also be used sulfones or sulfides of indigoid vat dyestuffs, perylenetetracarboxylic acid diimides or of perinone dyestuffs. The β-hydroxyethyl-sulfones or sulfides defined above can be obtained by reacting the appropriate sulfinates or mercaptans with chloroethyl alcohol, or by reacting a vat dyestuff that contains exchangeable halogen atoms, for example, a vat dyestuff sulfonic acid halide or an amino-anthraquinone, to the amino group of which a chlorotriazine radical is attached, with an amine of the formula

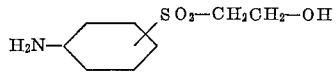

or

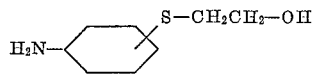

As starting materials for method (c) of the present process there may be used amino-anthraquinones, for example, 1:5-diaminoanthraquinones, 1-amino-5-benzoyl-aminoanthraquinone, 4-amino - anthraquinone - 2:1(N)-acridone, 4:4'-, 4:5'- or 5:5'-diamino-1:1'-dianthrimide carbazole.

As acylating agents that contain a halogen-alkyl-sulfone radical there may be mentioned in particular benzoic acid halides, advantageously those of the formulae

or

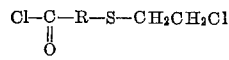

in which R represents a benzene radical. The said acylating agents are advantageously obtained by reacting the appropriate hydroxy-ethyl-sulfonyl acids or hydroxy-ethyl-sulfido benzoic acids with acid-chlorinating agents, such as thionyl chloride. Likewise suitable as acylating agents are, for example, compounds of the formula

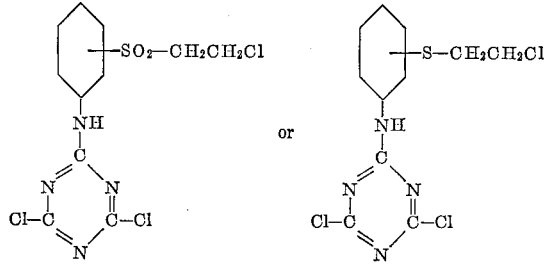

The reaction of the amino-anthraquinones with the acylating agent is carried out advantageously in an inert organic solvent, for example, nitrobenzene, chlorobenzene or ortho-dichlorobenzene, at a raised temperature. The molar ratios of the components are advantageously chosen in such a manner that there is approximately one carboxylic acid chloride group or a group of the formula

of the acylating agent for each amino group of the anthraquinone radical.

The dyestuffs so obtained can be isolated from the mixture in which they have been prepared and, notwithstanding the presence of the reactive grouping of the Formula 1, can be worked up into useful dry dyestuff preparations. The isolation is advantageously carried out by filtration. The filtered dyestuffs can be dried, if desired, after the addition of buffers or neutral or weakly alkaline extenders; drying is advantageously carried out at not too high a temperature and, if necessary, under reduced pressure.

The new dyestuffs are suitable for dyeing a very wide variety of materials, but especially for dyeing or printing textile materials of natural or regenerated cellulose by the usual vat dyeing or printing methods. The dyeings and prints produced therewith are distinguished by their excellent fastness to light and excellent properties of wet fastness.

The dyeings produced with the dyestuffs of the invention are, in many cases, fast to dry cleaning and migration. The dyed fabrics can therefore be coated with synthetic resins, for example, with polyvinyl chloride, without the dyestuff migrating into the resin, which is particularly important in the manufacture of artificial leather.

The dyestuffs of the invention can generally be vatted very easily, often at room temperature.

Unless otherwise stated, the parts and percentages in the following examples are by weight. The relationship of parts by weight to parts by volume is the same as that of the gram to the cubic centimeter.

EXAMPLE 1

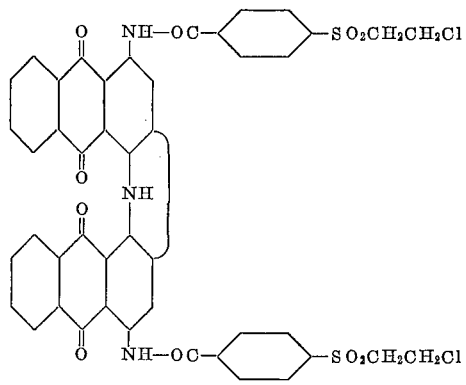

To 3.77 parts of 4-(β-chloroethyl sulfonyl)-benzoyl-chloride in 50 parts of dry nitrobenzene is added, at 90° C., a suspension of 2.3 parts of 4:4'-diamino-1:1'-dianthrimide carbazole in 38 parts of nitrobenzene, and the whole is stirred for 6 hours at 140–145° C. and for 2 hours at 170–175° C. After cooling the reaction mixture, the dyestuff, which precipitates in crystalline form, is isolated by filtration, washed successively with nitrobenzene and hot alcohol, and dried in vacuo at 70° C.

In the dry state, the dyestuff so obtained is in the form of olive-colored crystals and dyes cotton and regenerated cellulose, for example, by the process described in the last paragraph of this example, olive grey tints possessing very good properties fastness If, in this example, 5:5'-diamino-1:1'-dianthrimide carbazole is used instead of 4:4'-diamino-1:1'-dianthrimide carbazole, a dyestuff is obtained which dyes cellulosic fibers brown tints which possess excellent properties of wet fastness.

Fabrics dyed and printed with the dyestuffs so obtained can be coated with synthetic resins, for example, with plasticised polyvinyl chloride, without the dyestuff migrating into the resin, which is particularly important in the manufacture of artificial leather.

14 parts of the dyestuff obtained as described in the first paragraph of this example are finely ground in a ball mill for 24 hours with 126 parts of a neutral solution of 125 parts of dinaphthylmethane disulfonic acid in 1000 parts of water.

7.5 parts of the paste so obtained are suspended in 250 parts of warm water. The dyestuff suspension so obtained is introduced into a solution of 10 parts by volume of sodium hydroxide solution of 30% strength and 6 parts of sodium dithionite in 1750 parts of water, the solution having a temperature of 50° C., and vatted for one minute. 50 parts of cotton are dyed for 45 minutes at 50–60° C. in the dyebath so obtained in the presence of 60 parts of sodium chloride. After dyeing, the cotton is rinsed and soaped at the boil.

EXAMPLE 2

To a suspension of 7.35 parts of cyanurated 1-amino-5-benzoylamino-anthraquinone of the formula

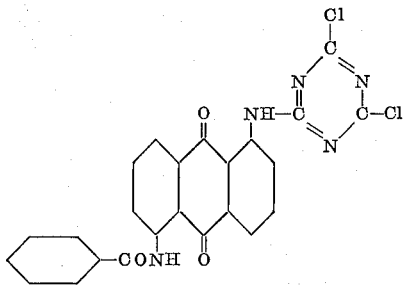

in 80 parts of nitrobenzene and 8 parts of N:N-diethylaniline are added, at 140° C., 3.5 parts of para-aminophenyl-($\beta$-chloroethyl)-sulfone of 95% strength. The whole is stirred for 6 hours at 140° C., cooled, and then slowly diluted with a mixture of 80 parts of nitrobenzene, 250 parts of benzene and 250 parts of ether. The dyestuff which is precipitated thereby, and which presumably has the formula

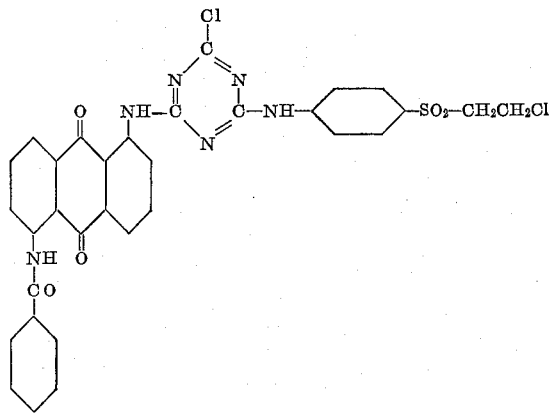

is isolated by filtration, washed with ether, and then dried in vacuo at 60° C. The dyestuff so obtained is a yellow powder which dyes cotton and regenerated cellulose fast yellow tints by the method described in Example 1.

EXAMPLE 3

To a fine suspension of 8.4 parts of cyanurated aminoacedianthrone in 100 parts of nitrobenzene and 8 parts of diethylaniline are added, at 140° C., 4.95 parts of para-amino-phenyl-($\beta$-chloroethyl)-sulfone. The whole is stirrred for 20 hours at 130–135° C. and cooled. The dyestuff which is precipitated thereby, and which presumably has the formula

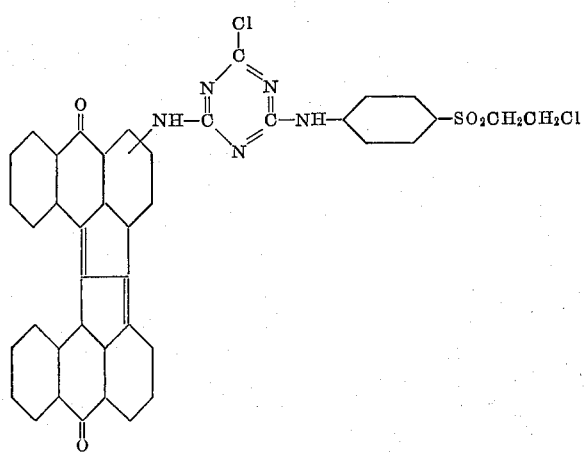

is isolated by filtration, well washed with ether, and then dried in vacuo at 65 to 70° C.

The dyestuff so obtained is a red-black powder which dyes cotton and regenerated cellulose very fast brown tints by the method described in Example 1.

EXAMPLE 4

5 parts of 1-amino-5-bezoylamino-anthraquinone are dissolved hot in 40 parts of ortho-dichlorobenzene and, to the solution so obtained, are added 3.45 parts of para-($\beta$-chloroethyl mercapto)-benzoylchloride. The solution so obtained is kept at the boil for 10 minutes and then cooled. The dyestuff which is precipitated thereby, and which has the formula

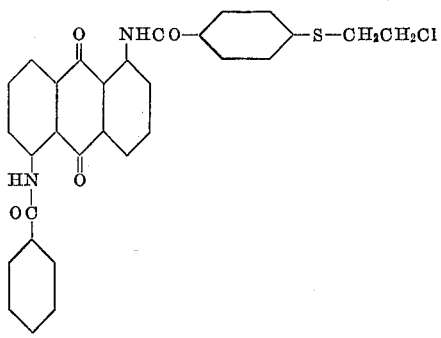

can be isolated by filtration, washed with hot alcohol, and dried in vacuo at 65 to 70° C. The dyestuff crystallizes from ortho-dichlorobenzene in the form of orange-yellow crystals and dyes cotton and regenerated cellulose yellow tints which are fast to washing when applied by the method described in Example 1.

EXAMPLE 5

5.1 parts of 1 - (4'-amino-benzoylamino)-5-benzoylamino-anthraquinone are suspended in 80 parts of nitrobenzene and, to the suspension so obtained, are added 2.6 parts of meta-($\beta$-chloroethyl mercapto)-benzoylchloride. The suspension so obtained is stirred for 30 minutes at 165° C. and cooled. The dyestuff which is precipitated thereby, and which has the formula

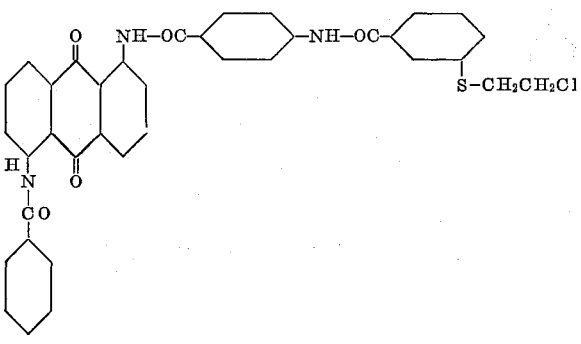

is isolated by filtration, washed with hot alcohol and dried. The dyestuff so obtained is a greenish yellow powder that dyes cotton and regenerated cellulose fast yelow tints by the method described in Example 1.

A dyestuff with similar properties is obtained when, in this Example, instead of meta-($\beta$-chloroethyl mercapto)-benzoylchloride, the corresponding ortho-isomer, ortho-($\beta$-chloroethyl mercapto)-benzoylchloride, is used.

EXAMPLE 6

4.1 parts of the dyestuff of the formula

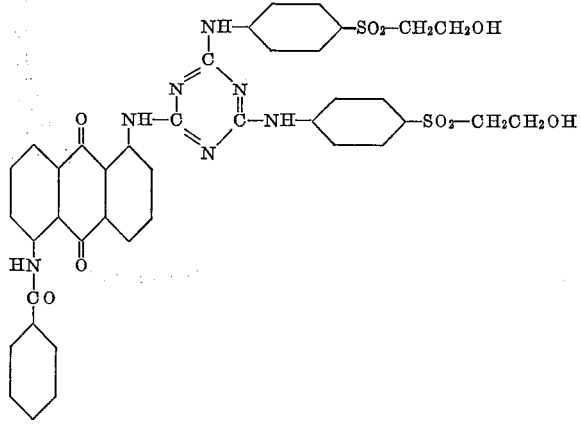

are heated for 2 hours at 120 to 125° C., while stirring, in 33 parts of nitrobenzene in the presence of 1.45 parts by volume of thionylchloride and 0.3 part by volume of dimethylformamide. When the reaction mixture has cooled, it is filtered, the filter cake is washed with ethanol and dried at 60 to 70° C. in vacuo. The dyestuff so obtained of the formula

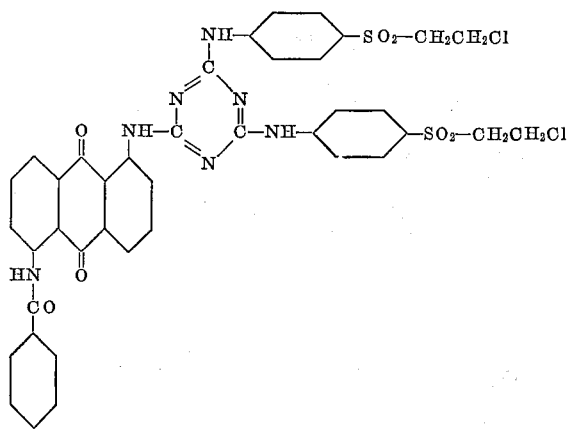

dyes cotton and regenerated cellulose fast yellow tints by the method described in Example 1.

EXAMPLE 7

1.25 parts of the dyestuff of the formula

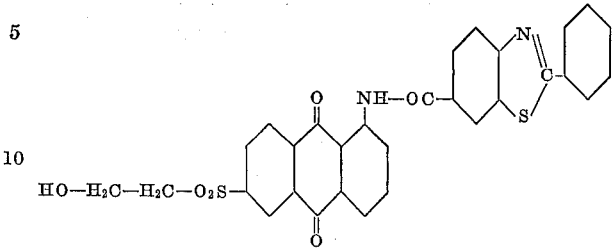

are stirred for 1 hour at 125° C. in 30 parts of nitrobenzene in the presence of 0.35 part by volume of thionylchloride and 0.05 part by volume of dimethylformamide. When the reaction mixture has cooled to 5° C. it is stirred for a further hour at that temperature. The reaction product so obtained is isolated by filtration, washed with ethanol, and then dried in vacuo at 60 to 70° C. The dyestuff so obtained of the formula

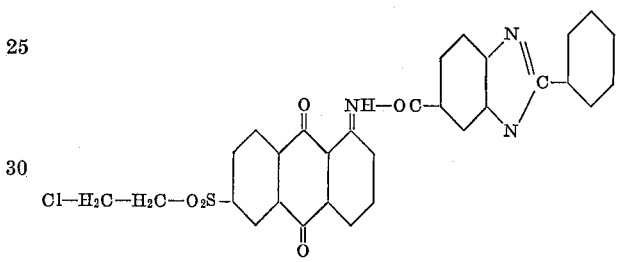

is an orange-yellow crystalline product that dyes cotton and regenerated cellulose pure yellow tints possessing good properties of fastness when applied by the method described in Example 1.

The starting dyestuff can be prepared as follows: To a solution of 1.8 parts of amino-anthraquinone of the formula

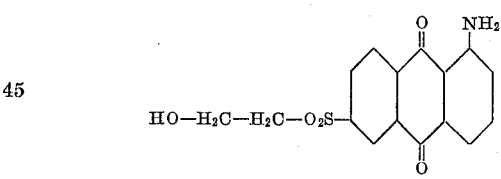

in 40 parts by volume of N-methyl-pyrrolidone are added at 120° C., 4.9 parts of 2-phenyl-benzthiazole-6-carboxylic acid chloride, and the whole is stirred for 3 minutes at 165° C. The reaction mixture is then cooled and diluted with 150 ml. of absolute ethanol. The dyestuff intermediate product that is precipitated thereby is isolated, boiled for a short period in 50 ml. of absolute ethanol, isolated and then dried.

EXAMPLE 8

A fine suspension of 3.0 parts of the dyestuff intermediate product of the formula

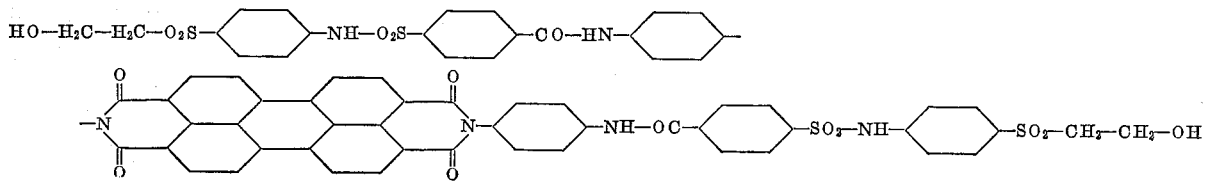

in 30 parts of nitrobenzene is stirred for 4 hours at 125° C. in the presence of 0.7 part by volume of thionylchloride and 0.15 part by volume of dimethylformamide. The isolated dyestuff of the formula

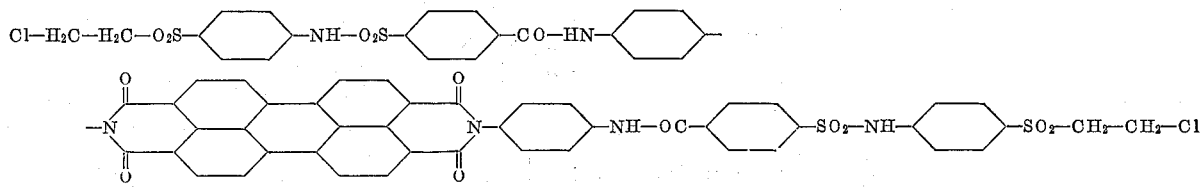

when in the dry state, is a dark red-brown product that dyes cotton and regenerated cellulose bright red tints when applied by the method described in Example 1.

The starting dyestuff can be prepared as follows:

A fine suspension of 3.25 parts of disulfochloride of the formula

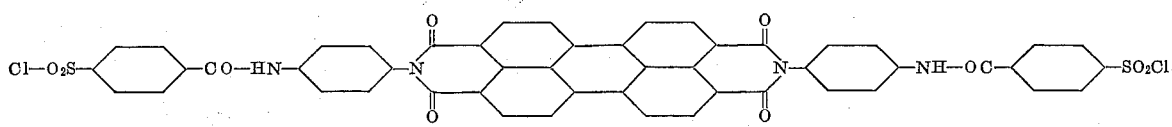

and 2.47 parts of para-aminophenyl-(β-hydroxy-ethyl)-sulfone and 0.3 part of anhydrous sodium carbonate in 50 parts of nitrobenzene and 8 parts by volume of N:N'-diethylaniline is stirred for 1 hour at 165° C. and cooled. The isolated dyestuff intermediate product is boiled up in ethyl alcohol of 80% strength, separated from the alcohol and then dried. In the dry state it is a dark a brown powder that no longer contains chlorine.

EXAMPLE 9

2.24 parts of the condensation product of 2 mols of 1-amino-anthraquinone with 1 mol of cyanuric chloride are heated for 16 hours at 175° C., while stirring, in 30 parts of nitrobenzene in the presence of 1.8 parts of para-amino-phenyl-(β-chloroethyl)-sulfone. When the reaction mixture has been cooled, the dyestuff of the formula

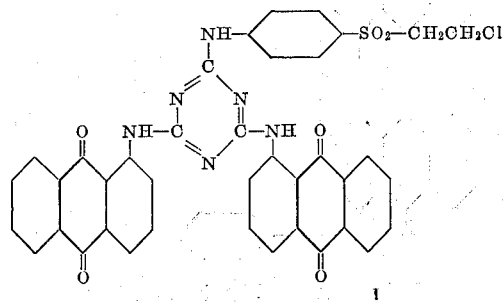

is isolated, boiled up for a short period in ethanol, isolated from the alcohol, and then dried. The dyestuff so obtained dyes cotton and regenerated cellulose pure yellow tints of high tinctorial strength when applied by the method described in Example 1.

EXAMPLE 10

1.8 parts of 1 - (4' - amino - benzoylamino)-5-benzoyl-amino-anthraquinone are suspended in 50 parts of nitrobenzene and, to this suspension, are added 1.1 parts of 4-(β-chloroethyl-sulfonyl)-benzoylchloride. The suspension so obtained is stirred for 30 minutes at 165° C. and then cooled. The dyestuff of the formula

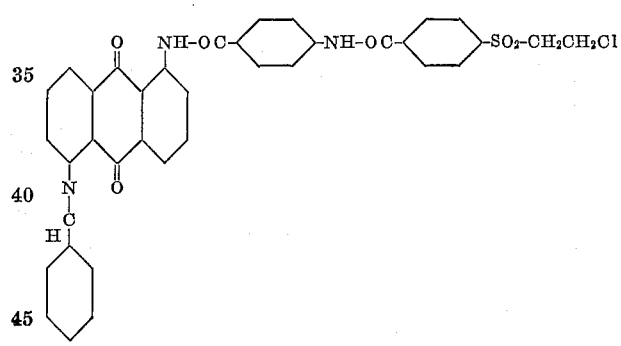

which is isolated by filtration, is boiled for a short period in ethanol, isolated by suction filtration, and dried. The dyestuff so obtained is a yellow crystalline product that dyes cotton and regenerated cellulose yellow tints possessing excellent properties of fastness when applied by the method described in Example 1.

EXAMPLE 11

To a suspension of 3.7 parts of cyanurated 1-amino-5-benzoylamino-anthraquinone of the formula

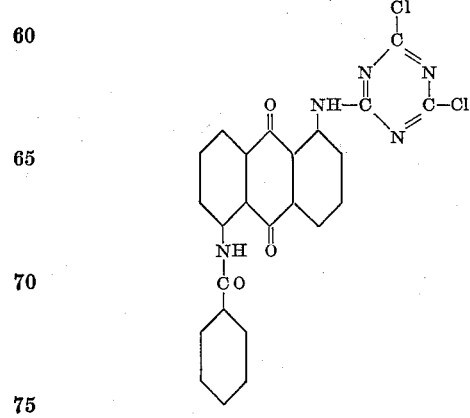

in 40 parts of nitrobenzene and 4 parts of N:N'-diethylaniline are added, at 110° C., 1.5 parts of para-aminophenyl-(para-chloroethyl)-sulfide. The whole is stirred for 5 hours at 140° C., cooled, and then slowly diluted with a mixture of 40 parts of benzene and 40 parts of ether. The dyestuff of the formula

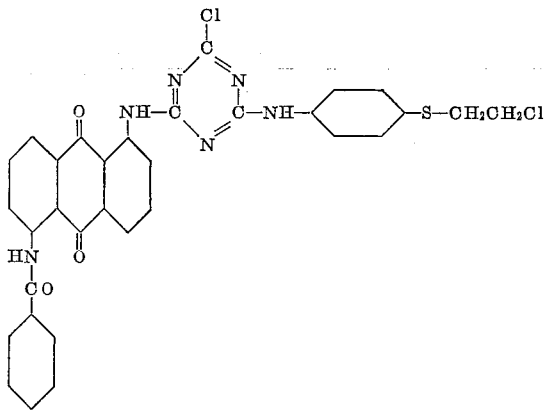

which precipitates thereby is isolated by filtration, washed with ether, and then dried in vacuo at 60° C. The dyestuff so obtained is a yellow powder that dyes cotton and regenerated cellulose fast yellow tints when applied by the method described in Example 1.

What is claimed is:
1. The vat dyestuff of the formula

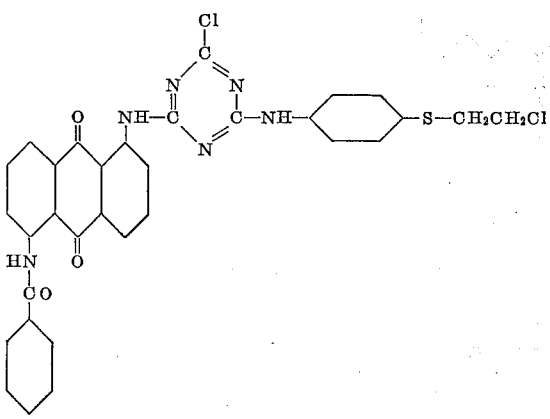

2. The vat dyestuff of the formula

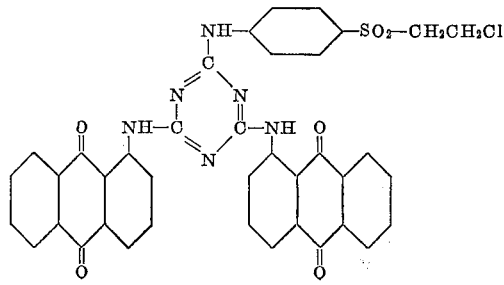

3. The vat dyestuff of the formula

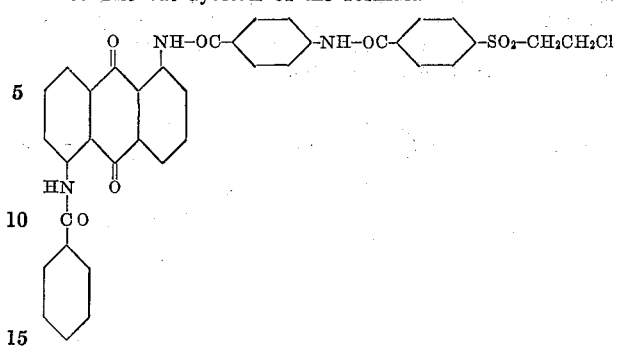

4. The vat dyestuff of the formula

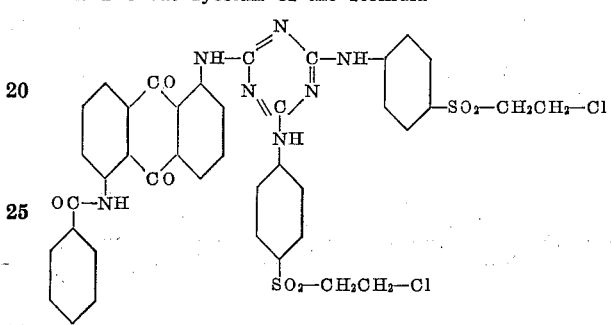

5. The vat dyestuff of the formula

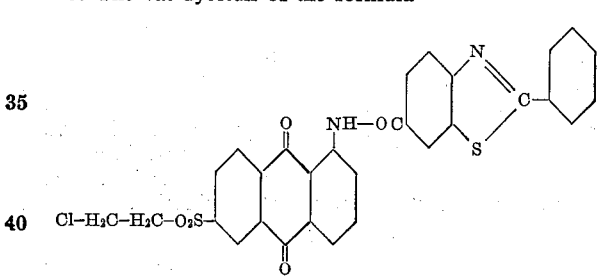

6. The vat dyestuff of the formula

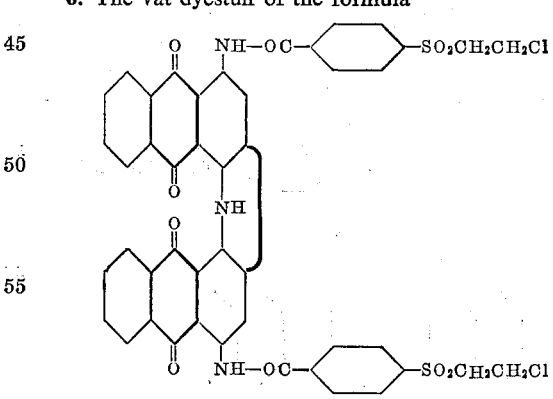

References Cited by the Examiner
UNITED STATES PATENTS
2,992,240   7/1961   Lodge _____ 260—271 X WALTER A. MODANCE, Primary Examiner.
IRVING MARCUS, M. WESTERN, R. BOND,
Examiners.